US011405302B1

(12) United States Patent
Liu et al.

(10) Patent No.: US 11,405,302 B1
(45) Date of Patent: Aug. 2, 2022

(54) METHODS, SYSTEMS, AND COMPUTER READABLE MEDIA FOR NETWORK TESTING USING CONFIGURABLE TEST INFRASTRUCTURE

(71) Applicant: Keysight Technologies, Inc., Santa Rosa, CA (US)

(72) Inventors: Winston Wencheng Liu, Woodland Hills, CA (US); Konstantin Belov, Thousand Oaks, CA (US); Matthew R. Bergeron, Sunol, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/198,870

(22) Filed: Mar. 11, 2021

(51) Int. Cl.
  *H04L 43/50* (2022.01)
  *H04L 41/0803* (2022.01)
  (Continued)

(52) U.S. Cl.
  CPC .......... *H04L 43/50* (2013.01); *H04L 41/0803* (2013.01); *H04L 43/0817* (2013.01);
  (Continued)

(58) Field of Classification Search
  CPC ..... H04L 43/50; H04L 43/08; H04L 43/0803; H04L 43/0817; H04L 43/0864; H04L 43/16; H04L 43/045; H04L 43/06; H04L 43/0829; H04L 43/10; H04L 43/04; H04L 43/065; H04L 43/087; H04L 43/0888; H04L 43/106; H04L 43/12; H04L 43/062;
  (Continued)

(56) References Cited

U.S. PATENT DOCUMENTS 4,792,753 A   12/1988 Iwai
5,247,517 A   9/1993 Ross et al.
(Continued)

FOREIGN PATENT DOCUMENTS

CN    107104903 A    8/2017
EP    0895375 A2    2/1999
(Continued)

OTHER PUBLICATIONS

Stevens, "TCP/IP Illustrated, vol. 1: The Protocols," pp. 1-3 (1994).
(Continued)

*Primary Examiner* — Glenton B Burgess
*Assistant Examiner* — Rachel J. Hackenberg

(57) ABSTRACT

According to one method, the method occurs at a test system implemented using at least one processor. The method includes receiving test configuration information associated with a test session for configuring a test infrastructure connecting at least one test application and a system under test (SUT), wherein the test infrastructure includes at least two CTI devices that are dynamically configurable to perform one or more test related functions; configuring, using test configuration information, the test infrastructure to handle traffic for the test session; initiating the test session, wherein the test session involves using the at least two CTI devices and the at least one test application to test the SUT; and obtaining and reporting test results associated with the test session.

20 Claims, 9 Drawing Sheets

(51) Int. Cl.
*H04L 43/0817* (2022.01)
*H04L 43/0864* (2022.01)
*H04L 43/16* (2022.01)
*H04L 67/12* (2022.01)
*H04L 12/00* (2006.01)
*H04L 69/22* (2022.01)

(52) U.S. Cl.
CPC .......... *H04L 43/0864* (2013.01); *H04L 12/00* (2013.01); *H04L 43/16* (2013.01); *H04L 67/12* (2013.01); *H04L 69/22* (2013.01)

(58) Field of Classification Search
CPC ............. H04L 43/0835; H04L 43/0876; H04L 41/5038; H04L 41/0803; H04L 1/24; H04L 63/0272; H04L 69/22; H04L 12/00; H04L 67/14; H04L 67/12
See application file for complete search history.

(56) References Cited

U.S. PATENT DOCUMENTS

| | | | |
|---|---|---|---|
| 5,343,463 A | 8/1994 | Van Tetering et al. |
| 5,390,314 A | 2/1995 | Swanson |
| 5,477,531 A | 12/1995 | McKee et al. |
| 5,535,338 A | 7/1996 | Krause et al. |
| 5,568,471 A | 10/1996 | Hershey et al. |
| 5,571,963 A | 11/1996 | Balchin et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny et al. |
| 5,671,351 A | 9/1997 | Wild et al. |
| 5,751,963 A | 5/1998 | Umetsu |
| 5,761,486 A | 6/1998 | Watanabe et al. |
| 5,787,147 A | 7/1998 | Gundersen |
| 5,787,253 A | 7/1998 | McCreery et al. |
| 5,822,520 A | 10/1998 | Parker |
| 5,838,919 A | 11/1998 | Schwaller et al. |
| 5,850,386 A | 12/1998 | Anderson et al. |
| 5,850,388 A | 12/1998 | Anderson et al. |
| 5,854,889 A | 12/1998 | Liese et al. |
| 5,878,032 A | 3/1999 | Mirek et al. |
| 5,905,713 A | 5/1999 | Anderson et al. |
| 5,974,237 A | 10/1999 | Shurmer et al. |
| 5,974,457 A | 10/1999 | Waclawsky et al. |
| 5,978,940 A | 11/1999 | Newman et al. |
| 5,982,852 A | 11/1999 | Schwartz |
| 5,991,265 A | 11/1999 | Lincoln |
| 6,011,777 A | 1/2000 | Kunzinger |
| 6,031,528 A | 2/2000 | Langfahl, Jr. |
| 6,044,091 A | 3/2000 | Kim |
| 6,108,800 A | 8/2000 | Asawa |
| 6,122,670 A | 9/2000 | Bennett et al. |
| 6,148,277 A | 11/2000 | Asava et al. |
| 6,172,989 B1 | 1/2001 | Yanagihara et al. |
| 6,173,333 B1 | 1/2001 | Jolitz et al. |
| 6,189,031 B1 | 2/2001 | Badger et al. |
| 6,233,256 B1 | 5/2001 | Dieterich et al. |
| 6,252,891 B1 | 6/2001 | Perches |
| 6,279,124 B1 | 8/2001 | Brouwer et al. |
| 6,295,557 B1 | 9/2001 | Foss et al. |
| 6,314,531 B1 | 11/2001 | Kram |
| 6,317,788 B1 | 11/2001 | Richardson |
| 6,321,264 B1 | 11/2001 | Fletcher et al. |
| 6,345,302 B1 | 2/2002 | Bennett et al. |
| 6,363,056 B1 | 3/2002 | Beigi et al. |
| 6,414,939 B1 | 7/2002 | Yamato |
| 6,430,617 B1 | 8/2002 | Britt et al. |
| 6,446,121 B1 | 9/2002 | Shah et al. |
| 6,507,923 B1 | 1/2003 | Wall et al. |
| 6,526,259 B1 | 2/2003 | Ho |
| 6,529,475 B1 | 3/2003 | Wan et al. |
| 6,535,487 B1 | 3/2003 | Biswas et al. |
| 6,545,979 B1 | 4/2003 | Poulin |
| 6,549,517 B1 | 4/2003 | Aweya et al. |
| 6,601,020 B1 | 7/2003 | Myers |
| 6,621,805 B1 | 9/2003 | Kondylis et al. |
| 6,678,246 B1 | 1/2004 | Smyth |
| 6,691,167 B2 | 2/2004 | Procopio et al. |
| 6,717,917 B1 | 4/2004 | Weissberger et al. |
| 6,785,238 B1 | 8/2004 | Kago |
| 6,826,259 B2 | 11/2004 | Hoffman |
| 6,845,352 B1 | 1/2005 | Wang |
| 6,917,595 B2 | 7/2005 | Chang et al. |
| 7,039,712 B2 | 5/2006 | Valavi et al. |
| 7,096,264 B2 | 8/2006 | Bonney et al. |
| 7,099,438 B2 | 8/2006 | Rancu et al. |
| 7,123,616 B2 | 10/2006 | Weissberger et al. |
| 7,143,159 B1 | 11/2006 | Grace et al. |
| 7,222,255 B1 | 5/2007 | Claessens et al. |
| 7,304,951 B2 | 12/2007 | Rhee |
| 7,327,686 B2 | 2/2008 | Standridge |
| 7,342,897 B1 | 3/2008 | Nader et al. |
| 7,366,174 B2 | 4/2008 | MacFaden et al. |
| 7,418,492 B1 * | 8/2008 | Cohen .................... H04L 43/00 709/224 |
| 7,468,947 B2 | 12/2008 | Mannal et al. |
| 7,486,728 B2 | 2/2009 | Park |
| 7,507,948 B2 | 3/2009 | Park et al. |
| 7,525,473 B2 | 4/2009 | Chu et al. |
| 7,783,463 B2 | 8/2010 | Herro |
| 7,840,664 B2 | 11/2010 | Dugatkin et al. |
| 7,873,056 B2 | 1/2011 | Higuchi et al. |
| 7,908,130 B2 | 3/2011 | Van Ginkel et al. |
| 7,979,225 B2 | 7/2011 | Muller et al. |
| 8,718,070 B2 | 5/2014 | Koponen et al. |
| 8,761,187 B2 | 6/2014 | Barde |
| 8,898,333 B1 | 11/2014 | White et al. |
| 8,914,432 B2 | 12/2014 | Hannel et al. |
| 8,942,109 B2 | 1/2015 | Dorenbosch et al. |
| 8,949,830 B2 | 2/2015 | Kannan et al. |
| 8,959,185 B2 | 2/2015 | Nakil et al. |
| 9,042,245 B2 | 5/2015 | Tzannes et al. |
| 9,049,271 B1 | 6/2015 | Hobbs et al. |
| 9,065,770 B2 | 6/2015 | Chew et al. |
| 9,231,849 B2 | 1/2016 | Hyoudou et al. |
| 9,294,296 B2 * | 3/2016 | Kirschnick .......... G06F 11/3433 |
| 9,503,382 B2 | 11/2016 | DeCusatis et al. |
| 9,544,233 B2 | 1/2017 | Ansari et al. |
| 9,614,689 B2 | 4/2017 | Cook et al. |
| 9,628,339 B1 | 4/2017 | Thai et al. |
| 9,819,551 B2 * | 11/2017 | Forster .................... H04L 41/12 |
| 9,898,317 B2 | 2/2018 | Nakil et al. |
| 9,971,620 B2 | 5/2018 | Karnes |
| 10,015,072 B2 | 7/2018 | Cantwell et al. |
| 10,063,473 B2 | 8/2018 | Wenig |
| 10,579,408 B2 | 3/2020 | Wang et al. |
| 10,623,296 B2 | 4/2020 | Haramaty et al. |
| 10,686,671 B1 | 6/2020 | Mozumdar et al. |
| 10,733,088 B1 | 8/2020 | Sommers |
| 10,742,533 B2 * | 8/2020 | Yadav .................... H04L 43/50 |
| 10,868,730 B2 | 12/2020 | Mozumdar et al. |
| 10,880,019 B1 | 12/2020 | Mestre Adrover et al. |
| 10,880,197 B2 | 12/2020 | Naskar et al. |
| 2001/0016867 A1 | 8/2001 | Hu et al. |
| 2002/0056100 A1 | 5/2002 | Shimomura et al. |
| 2002/0085502 A1 | 7/2002 | Chheda et al. |
| 2002/0105911 A1 | 8/2002 | Pruthi et al. |
| 2002/0138226 A1 | 9/2002 | Doane |
| 2002/0162059 A1 * | 10/2002 | McNeely ................. H04L 51/18 714/703 |
| 2002/0172205 A1 | 11/2002 | Tagore-Brage et al. |
| 2002/0184527 A1 | 12/2002 | Chun et al. |
| 2003/0009544 A1 | 1/2003 | Wach |
| 2003/0043434 A1 | 3/2003 | Brachmann et al. |
| 2003/0061506 A1 | 3/2003 | Cooper et al. |
| 2003/0069952 A1 | 4/2003 | Tams et al. |
| 2003/0139919 A1 | 7/2003 | Sher et al. |
| 2003/0188003 A1 | 10/2003 | Sylvest et al. |
| 2003/0191590 A1 * | 10/2003 | Narayan ............... H04L 41/22 702/68 |
| 2003/0231741 A1 | 12/2003 | Rancu et al. |
| 2004/0111502 A1 | 6/2004 | Oates |

(56) References Cited

U.S. PATENT DOCUMENTS

| | | | |
|---|---|---|---|
| 2004/0111519 | A1 | 6/2004 | Fu et al. |
| 2004/0117474 | A1 | 6/2004 | Ginkel et al. |
| 2004/0190449 | A1 | 9/2004 | Mannal et al. |
| 2004/0190606 | A1 | 9/2004 | Deshpande |
| 2004/0236866 | A1 | 11/2004 | Dugatkin et al. |
| 2005/0021715 | A1 | 1/2005 | Dugatkin et al. |
| 2006/0002305 | A1 | 1/2006 | Ginzburg |
| 2007/0133441 | A1 | 6/2007 | Kang et al. |
| 2007/0165531 | A1 | 7/2007 | Labrador et al. |
| 2008/0186968 | A1 | 8/2008 | Farinacci et al. |
| 2009/0168720 | A1 | 7/2009 | Vinayakray-Jani et al. |
| 2010/0008305 | A1 | 1/2010 | Yeo et al. |
| 2010/0153055 | A1 | 6/2010 | Mucha et al. |
| 2010/0299433 | A1 | 11/2010 | De Boer et al. |
| 2012/0120801 | A1 | 5/2012 | Ramakrishnan et al. |
| 2013/0013107 | A1 | 1/2013 | Felique |
| 2014/0006570 | A1* | 1/2014 | Loos ...................... H04L 43/50 709/220 |
| 2014/0047125 | A1 | 2/2014 | Hyoudou et al. |
| 2014/0160961 | A1* | 6/2014 | Dragulescu ......... H04L 43/0894 370/252 |
| 2014/0298335 | A1 | 10/2014 | Regev et al. |
| 2014/0321285 | A1* | 10/2014 | Chew ...................... H04L 43/12 370/236 |
| 2015/0317169 | A1 | 11/2015 | Sinha et al. |
| 2015/0334030 | A1 | 11/2015 | Vasseur et al. |
| 2015/0365288 | A1 | 12/2015 | Van Der Merwe et al. |
| 2017/0126588 | A1 | 5/2017 | Anand et al. |
| 2019/0222481 | A1 | 7/2019 | Hira |
| 2019/0372881 | A1 | 12/2019 | Hu et al. |
| 2020/0021512 | A1* | 1/2020 | Naskar ...................... G06F 8/41 |
| 2020/0028772 | A1 | 1/2020 | Laslau |
| 2020/0112524 | A1 | 4/2020 | Sindhu et al. |
| 2020/0133688 | A1 | 4/2020 | Shinde et al. |
| 2020/0195519 | A1 | 6/2020 | Di Martino |
| 2020/0280518 | A1 | 9/2020 | Lee et al. |
| 2020/0296023 | A1 | 9/2020 | Kumar et al. |
| 2020/0313999 | A1 | 10/2020 | Lee et al. |
| 2020/0366588 | A1 | 11/2020 | Bergeron |

FOREIGN PATENT DOCUMENTS

| | | |
|---|---|---|
| JP | 2000049863 | 2/2000 |
| JP | 2000278265 | 10/2000 |
| JP | 4620103 B2 | 1/2011 |
| WO | 02056541 A2 | 7/2002 |
| WO | 2021015802 A1 | 1/2021 |

OTHER PUBLICATIONS

Nichols, "Improving Network Simulation with Feedback," IEEE, 14 pages (1998).
Li et al., "A Simulation Study of TCP Performance in ATM Networks with ABR and UBR Services," IEEE, pp. 1269-1276(1996).
Non-Final Office Action for U.S. Appl. No. 10/317,312 (dated Jan. 30, 2006).
Kurose et al., "Computer Networking: A Top-Down Approach Featuring the Internet," pp. 167-172 (2001).
"UCB/LBNL/NINT Network Simulator—ns (version 2)," http://web.archive.org/web/20000819030658/http://www.isi.edu/nsnam/ns/. Information Sciences Institute, 4 pages (Aug. 2000).
Leon-Garcia et al., "Communication Networks Fundamentals Concepts and Key Architectures," pp. 57-63 and 575-577 (2000).
Fall et al., "Simulation-based Comparisons of Tahoe, Reno, and SACK TCP," 18 pages (Jan. 7, 1998).
Notice of Allowance and Fee(s) Due for U.S. Appl. No. 10/317,312 (dated Dec. 9, 2010).
Interview Summary for U.S. Appl. No. 10/317,312 (dated Aug. 25, 2010).
Non-Final Office Action for U.S. Appl. No. 10/317,312 (dated May 7, 2010).
Final Office Action for U.S. Appl. No. 10/317,312 (dated Mar. 26, 2009).
Non-Final Office Action for U.S. Appl. No. 10/317,312 (dated Aug. 29, 2008).
Non-Final Office Action for U.S. Appl. No. 10/317,312 (dated Mar. 17, 2008).
Final Office Action for U.S. Appl. No. 10/317,312 (dated Sep. 12, 2007).
"TCP/IP model," http://en.wikipedia.org/wiki/TCP/IP_model, 8 pages (Aug. 2007).
Non-Final Office Action for U.S. Appl. No. 10/317,312 (dated Mar. 22, 2007).
Final Office Action for U.S. Appl. No. 10/317,312 (dated Aug. 11, 2006).
Zhang et a., "HyperV: A High Performance Hypervisor for Virtualization of the Programmable Data Plane," 2017 26th International Conference on Computer Communication and Networks (ICCCN), pp. 1-9 (2017).
Cziva et al., "High-Performance Virtualized SDN Switches for Experimental Network Testbeds," SI:SC16—INDIS, pp. 1-14 (Nov. 8, 2016).
Khalidi, "SONiC: The networking switch software that powers the Microsoft Global Cloud," Blog(/en-us/blog/) Cloud Strategy, pp. 1-10 (Mar. 8, 2017).
Siron, "What is the Hyper-V Virtual Switch and How Does it Work?" Altaro, pp. 1-22 (Sep. 26, 2019).
Han et al., "Virtualization in Programmable Data Plane: A Survey and Open Challenges," IEEE Open Journal of the Communications Society, pp. 1-7 (2020).
"Networking/SAI," Open Compute, pp. 1-6 (Oct. 2020).
Spirent Communications, "Cloud Computing Testing," pp. 1-10 (Apr. 2010).
Byagowi, A., et al., "Bringing the F16 Network into the Lab," OCP Global Summit, pp. 1-16 (Jan. 29, 2021).
Zhang, C., et al., "MPVisor: A Modular Programmable Data Plane Hypervisor," SOSR, pp. 1-2 (Apr. 3-4, 2017).
Zhou et al., "HyperTester: High-performance Network Testing Driven by Programmable Switches," In the 15th International Conference on emerging Networking Experiments and Technologies (CoNEXT '19), pp. 1-14 (Dec. 9-12, 2019).
Notice of Allowance and Fee(s) Due for U.S. Appl. No. 17/067,627 (dated Oct. 22, 2021).
Advisory Action for U.S. Appl. No. 17/069,768 (dated Sep. 28, 2021).
Notice of Allowance and Fee(s) Due for U.S. Appl. No. 17/067,627 (dated Aug. 20, 2021).
Final Office Action for U.S. Appl. No. 17/069,768 (dated Jul. 9, 2021).
Non-Final Office Action for U.S. Appl. No. 17/069,768 (dated Feb. 4, 2021).
Commonly-Assigned, co-pending U.S. Appl. No. 17/067,627 for "Methods, Systems, and Computer Readable Media for Network Testing Using Switch Emulation," (Unpublished, filed Oct. 9, 2020).
Commonly-Assigned, co-pending U.S. Appl. No. 17/069,768 for "Methods, Systemsand Computer Readable Media for Active Queue Management," (Unpublished, filed Oct. 13, 2020).
Non-Final Office Action for U.S. Appl. No. 17/069,768 (dated Jan. 27, 2022).
Notice of Allowance and Fee(s) Due for U.S. Appl. No. 17/067,627 (dated Feb. 8, 2022).
Notice of Allowance and Fee(s) Due for U.S. Appl. No. 17/217,920 (dated Jan. 14, 2022).
"INE Network Emulator Appliance," Technical Specifications, pp. 1-2 (2018).
"TekExpress USB 3.0 (USB-RMT) Automated Receiver Compliance and Margin Test Solutions," Tektronix, pp. 1-154 (2021).
"QSFP DD Loopback Modules," High Speed IO, Amphenol ICC, pp. 1-2 (2021).
Sultana et al., "Flightplan Dataplane Disaggregation and Placement for P4 Programs," 18th {USENIX} Symposium on Networked Systems Design and Implementation, pp. 1-22 (2021).

(56) References Cited

OTHER PUBLICATIONS

"Agilent E4219A ATM Network Impairment Emulator," Keysight, pp. 1-5 (2021).

"Spirent Network Emulator," Spirent Communications, pp. 1-11 (Apr. 2021).

"Ethernet Network Emulator," MGA2510 Product Brief, Aukua Systems, pp. 1-2 (2021).

"Chimera Network Impairment Emulator," Xena Networks, pp. 1-2 (2021).

Commonly-Assigned, co-pending U.S. Appl. No. 17/542,011 for "Methods, Systems, and Computer Readable Media for Providing Adaptive Background Test Traffic in a Test Environment." (Unpublished, filed Dec. 3, 2021).

Commonly-Assigned, co-pending U.S. Appl. No. 17/498,723 for "Methods, Systems, and Computer Readable Media for Recycling Background Traffic in a Test Environment," (Unpublished, filed Oct. 11, 2021).

"Network Emulator II—Ethernet 10GE, 1GE, and 100MbE Ethernet Impairment Emulation," Keysight Technologies, pp. 1-8 (Oct. 22, 2020).

Cao et al., "TurboNet: Faithfully Emulating Networks with Programmable Switches," IEEE, pp. 1-11 (2020).

"Datasheet—Albedo NetStorm," Albedo Telecom, pp. 1-2 (Dec. 23, 2015).

"Albedo Net.Storm," NETSTORM.en, pp. 1-4 (2014).

"The Value of Network Impairment Testing in Power Grids," Calnex SNE, pp. 1-2 (2006).

Tos et al., "Adaptive RTP Rate Control Method," 2011 35th IEEE Annual Computer Software and Applications Conference Workshops, pp. 1-6 (2011).

Mittal et al., "Dynamic Simulation Control with Queue Visualization," Summer Computer Simulation Conference, pp. 1-7 (Jun. 2005).

Notice of Allowance and Fee(s) Due for U.S. Appl. No. 17/217,920 (dated Mar. 4, 2022).

\* cited by examiner

METHODS, SYSTEMS, AND COMPUTER READABLE MEDIA FOR NETWORK TESTING USING CONFIGURABLE TEST INFRASTRUCTURE

TECHNICAL FIELD

The subject matter described herein relates to network testing. More specifically, the subject matter relates to methods, systems, and computer readable media for network testing using configurable test infrastructure.

BACKGROUND

Network operators may perform testing of a network or nodes therein before or after deployment. When testing network environments, it may be desirable to design a test session or a set of test sessions such that a system under test (SUT) is tested using real-world scenarios and conditions in a realistic environment or infrastructure. With some network test systems, a device or system under test is connected to test ports of the test system via cables that are manually connected by a test operator prior to execution of a test session. However, sometimes multiple different infrastructure configurations may need to be tested. When executing a set of test sessions involving different environments or infrastructures (e.g., test beds), a test operator may need to manually change the physical connections between the SUT, the test system, and any intermediate nodes before testing the SUT. As such, testing using different environments or infrastructures can be difficult and/or inefficient with such network test systems due to the time and human resource intensive nature involved in manually changing physical connections in test infrastructures.

Accordingly, a need exists for methods, systems, and computer readable media for network testing using configurable test infrastructure.

SUMMARY

Methods, systems, and computer readable media for network testing using configurable test infrastructure are disclosed. According to one method, the method occurs at a test system implemented using at least one processor. The method includes receiving test configuration information associated with a test session for configuring a test infrastructure connecting at least one test application and a system under test (SUT), wherein the test infrastructure includes at least two CTI devices that are dynamically configurable to perform one or more test related functions; configuring, using test configuration information, the test infrastructure to handle traffic for the test session including configuring each of the at least two CTI devices to act as a packet switch, a test packet generator, a telemetry processor, a traffic visibility element, or combinations thereof; initiating the test session, wherein the test session involves using the at least two CTI devices and the at least one test application to test the SUT; and obtaining and reporting test results associated with the test session.

According to one system, the system includes a test system implemented using at least one processor. The test system is configured for: receiving test configuration information associated with a test session for configuring a test infrastructure connecting at least one test application and a SUT, wherein the test infrastructure includes at least two CTI devices that are dynamically configurable to perform one or more test related functions; configuring, using test configuration information, the test infrastructure to handle traffic for the test session including configuring each of the at least two CTI devices to act as a packet switch, a test packet generator, a telemetry processor, a traffic visibility element, or combinations thereof; initiating the test session, wherein the test session involves using the at least two CTI devices and the at least one test application to test the SUT; and obtaining and reporting test results associated with the test session.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

Figure 1:
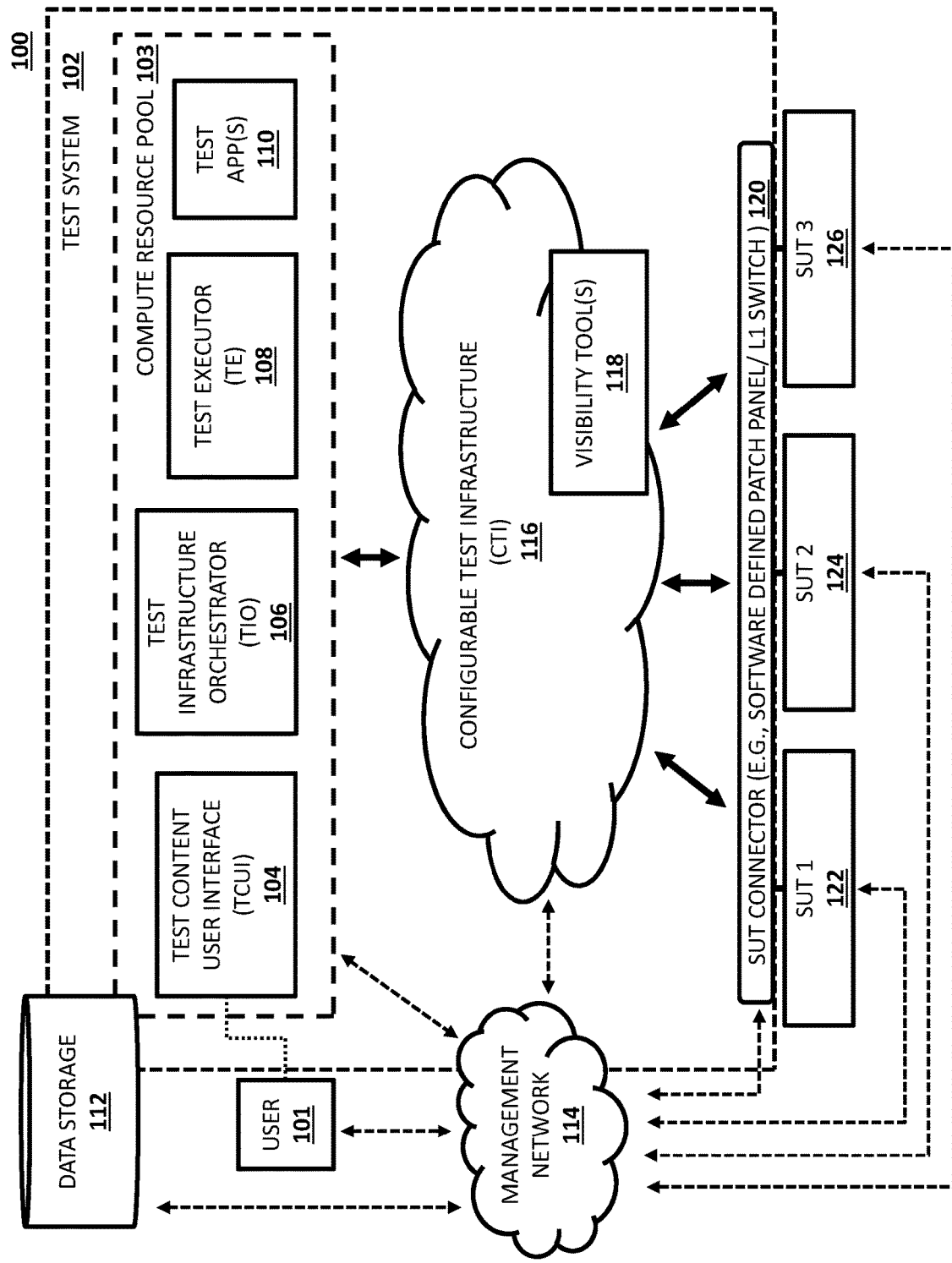
FIG. 1 is a diagram illustrating an example test environment comprising a configurable test infrastructure (CTI)

The subject matter described herein relates to methods, systems, and computer readable media network for testing using configurable test infrastructure (CTI). When testing networks or other system(s) under test (SUT), it may be desirable to test equipment using different test environments or infrastructures, e.g., test bed configurations. However, testing using different environments or infrastructures can be difficult, time consuming, and/or inefficient especially when test operators must manually change physical connections between various nodes or devices.

In accordance with some aspects of the subject matter described herein, a test system or a related entity may utilize a CTI, thereby improving test configuration speeds and reducing various inefficiencies. For example, a test system in accordance with some aspects of the subject matter described herein may be configured for receiving test configuration information associated with a test session for configuring a test infrastructure connecting at least one test application and a SUT, wherein the test infrastructure includes at least two CTI elements (CTIEs) (e.g., software and/or hardware programmable devices or platforms) that are dynamically configurable to perform one or more test related functions; configuring, using test configuration information, the test infrastructure to handle traffic for the test session; initiating the test session, wherein the test session involves using the at least two CTIEs and the at least one test application to test the SUT; and obtaining and reporting test results associated with the test session.

In accordance with some aspects of the subject matter described herein, a CTI may include a plurality of CTIEs communicatively connected to one or more SUTs, where each of the CTIEs includes resources (e.g., hardware, software, and/or firmware) capable of being dynamically (re-) configurable for performing one or more test related functions. For example, a CTIE in a CTI may be a software configurable white box switch or other network appliance. In this example, the CTIE may be capable of being configured to act as a packet switch, a test packet generator, a telemetry processor, a traffic visibility element, or various combinations thereof. In this example, at least some of CTIEs in a CTI may be fungible, e.g., interchangeable based on functionality or capabilities.

In accordance with some aspects of the subject matter described herein, a test system or a related CTI may include physical or virtual CTIEs (e.g., traffic generators, switches, telemetry collectors, etc.), compute pool resources (e.g., host servers, private cloud, etc.), a management network for sending configuration instructions, telemetry information, or other data to one or more test related entities, and a SUT connector (e.g., a software defined cross connect, a patch panel, or a layer 1 (L1) switch) for connecting SUTs and CTIEs or other test related entities.

By using a CTI or CTIEs, an example test system can perform network testing involving a SUT or a device under test (DUT) that may not have been possible using previous test systems or that may have been very time consuming, expensive, and potentially prone to human-error (e.g., because of manual cabling/re-cabling required for different test sessions).

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a diagram illustrating an example test environment 100 for network testing using CTI. Test environment 100 may include one or more networks, nodes, and/or devices, including test system 102 and SUTs 122-126. In some embodiments, test system 102 may include a stand-alone tool, a testing device, a network equipment test device or platform, or software executing on one or more processor(s). In some embodiments, test system 102 may be a single device or node or may be distributed across multiple devices or nodes, e.g., a cloud based test system. In some embodiments, test system 102 may include one or more modules for performing various test related functions. For example, test system 102 may include functionality for emulating various different nodes or entities and may communicate with SUTs 122-126 or other entities using various internal and/or external communications interfaces.

Test system 102 may include or interact with a user 101, a compute resource pool 103, a test content user interface (TCUI) 104, a test infrastructure orchestrator (TIO) 106, a test executor (TE) 108, test app(s) 110, a data storage 112, a management network 114, a CTI 116, visibility tool(s) 118, and/or a SUT connector 120.

User 101 may represent a human or another entity (e.g., a management system) that interacts with test system 102 or related entities. For example, user 101 may interact with one or more of user interfaces (UIs) or graphical user interfaces (GUIs) for selecting test content (e.g., test sessions, test templates, test session definitions, etc.), configuring test sessions or CTI 116, reviewing or analyzing test results or performance metrics, and/or interacting with other test related entities.

Compute resource pool 103 may represent a group of compute resources (e.g., processors, field-programmable gateway arrays (FPGAs), application-specific integrated circuits (ASICs), physical servers, virtual servers, etc.) capable of executing software and/or performing one or more test related applications. In some embodiments, compute resource pool 103 may include compute resources located in a distributed computing environment or a cloud computing platform (e.g., an AWS platform, an Azure platform, an edge cloud platform, a private cloud platform, etc.). In some embodiments, various test related entities (e.g., TCUI 104, TIO 106, TE 108, and/or test app(s) 110) may be implemented using one or more compute resources of compute resource pool 103.

TCUI 104 may be any suitable entity or entities (e.g., software executing on one or more compute resources) for providing one or more UIs for allowing user 101 to interact with test system 102 or related entities. In some embodiments, TCUI 104 may allow user 101 to browse and select to test session definitions or other test content (e.g., stored in data storage 112) via a GUI or other UI. In such embodiments, test content may be selected configuring test environment 100, CTI 116, and/or other test related entities. For example, via TCUI 104, user 101 can select a test session definition indicating a particular CTI or an associated CTI configuration for a test session, can provide additional configuration information needed for setting up a CTI or CTIEs associated with the test session; can provide various other settings or configurations associated with executing the test session, and/or can provide or display test related information about the test session to user 101.

In some embodiments, a test session definition and other related test content may include instructions for indicating how various CTIEs of CTI 116 are to be configured with respect to a given test session. For example, a test session definition may include configuration instructions for: configuring one or more CTIEs as packet switching resources (e.g., virtual local area network (VLAN) configuration and/ or provisioning of white box spine and/or leaf switches, etc.), configuring one or more CTIEs as test packet generation resources (e.g., using software-configurable ASICs or other resources in the CTIEs), configuring one or more CTIEs as telemetry generation, collection, and/or processing resources, for configuring compute-pool resources to perform traffic generation (e.g., in connection with or to be controlled by native test system apps 110 or third party apps), for configuring SUT connector 120 (e.g., software configurable patch panels, cross connects, L1 switches, etc.) for connecting SUTs 122-126 and test system 102.

In some embodiments, TCUI 104 may support automation e.g., via one or more programming languages (e.g., python), a representation state transfer (REST) application programming interface (API), a remote procedure call API (e.g., gRPC API), a command line interface (CLI), a machine-to-machine (M2M) automation interface, and/or a web based GUI.

TIO 106 may be any suitable entity or entities (e.g., software executing on one or more compute resources) for performing one or more aspects associated with orchestrating a test session. For example, orchestrating a test session may involve interpreting, generating, performing configuration actions associated with a test session or a related test session definition. In this example, TIO 106 may generate commands or instructions responsible for configuring or standing up CTIEs needed for a particular test session. In another example, TIO 106 may generate commands or instructions responsible for configuring SUT connector 120 and/or other entities.

In some embodiments, configuration actions performed by TIO 106 may include, but are not limited to, standing up SUT(s) 122-126, configuring physical or virtual links, configuring SUT connector 120, standing up instances of third party apps, standing up instances of a native test apps, standing up CTIEs (e.g., white box switches) in CTI 116, standing up compute resources in compute resource pool 103, and configuring elements of a real or emulated switching fabric.

In some embodiments, TIO 106 may be configured to analyze obtained test session definition or related content and may generate or modify test configuration instructions, including configuration instructions for CTIEs. For example, TIO 106 may be configured to analyze or determine SUT performance capabilities and may generate associated test infrastructure resource configuration instructions that are based, at least in part, on the SUT performance capabilities. In another example, TIO 106 may be configured to access and utilize predetermined configuration instruction information from a test session definition, e.g., with no modifications.

TE 108 may be any suitable entity or entities (e.g., software executing on one or more compute resources) for performing one or more aspects associated with executing or managing a test session. For example, executing a test session may involve starting, stopping, or pausing test traffic generation and/or performance monitoring using one or more commands sent to CTI 116 or other test related entities, e.g., via management network 114.

In some embodiments, TE 108 may be configured to initiate and manage execution of a test session involving CTI 116. For example, TE 108 may communicate with and control CTIEs of CTI 116 (e.g., emulated switching fabric, visibility components, third party apps, etc.) during a test session and may use these CTIEs to send test traffic and/or to gather telemetry or performance results. In another example, TE 108 may communicate with one or more visibility tool(s) 118 located in or separate from CTI 116.

Test app(s) 110 may be any suitable entity or entities (e.g., software executing on one or more compute resources) for performing one or more aspects associated with testing or related services. For example, test app(s) 110 may represent one or more native test applications for performing different types of tests, generating different types of test traffic, and performing different types of test analyses or reports. In another example, test app(s) 110 may represent one or more third part test applications that can be utilized by test system 102 and may include access to various types of traffic engines or functionality not provided natively.

Data storage 112 may be any suitable entity or entities (e.g., a storage device, a non-transitory computer readable medium, or a storage system) for maintaining or storing information related to CTI configuration, network testing, or related test analysis. For example, data storage 112 may include test session definitions, test traffic templates or models, and/or configuration instructions for configuring CTI or CTIEs therein. Data storage 112 may also include information usable for generating performance metrics (e.g., statistics) associated with one or more aspects of SUTs 122-126, performance metrics, and/or other information associated with testing SUTs 122-126. In some embodiments, data storage 112 may be located in test system 102 or may be external to and accessible by test system 102. For example, data storage 112 may be implemented using storage resources of a cloud computing platform.

Management network 114 may include one or more networks, nodes, and/or devices for communicating with and/or between test related entities. In some embodiments, management network 114 may include an API server or another entity that can send configuration instructions, management commands, and/or provision information to one or more test related entities for configuring, executing, and analyzing a test session. In some embodiments, management network 114 may also route test traffic to CTIEs or other elements from one or more test app(s) 110. For example, test traffic may be generated from multiple sources and locations and can reach SUTs 122-126 via CTI 116 and/or management network 114.

CTI 116 may be any suitable entity or entities for providing a dynamically configurable test bed or infrastructure usable for testing SUTs 122-126. In some embodiments, CTI 116 may include one or more CTIEs (e.g., programmable white box switches, network devices, ASIC platforms, etc.) that can be (re-)configured to perform one or more test related functions for a given test session and may be connected to SUTs 122-126 (e.g., via SUT connector 120). In such embodiments, each CTIE may be remotely configurable, e.g., using configuration instructions from TIO 106. For example, each CTIE may be configured to behave or function as a switch (e.g., leaf switch, spine switch, etc.), to behave or function as a test packet generator, to behave or function as a telemetry (e.g., in-band telemetry (INT)) collector, or some combination of these functions. In some embodiments, CTI 116 may also include other virtual or physical devices for facilitating testing of SUTs 122-126.

Visibility tool(s) 118 may be any suitable entity or entities (e.g., software executing on a processor, an ASIC, an FPGA, or a combination of software, an ASIC, or an FPGA) for monitoring, obtaining, and/or providing SUT performance, CTI performance, or related visibility information (e.g., using virtual or physical probes or network taps). For example, visibility tool(s) 118 may include an API based server or interface that provides collected performance metrics or other related information to test system 102 or entities therein. In this example, visibility tool(s) 118 may obtain test performance related data from one or more visibility related devices, applications, or nodes within or around CTI 116 and/or SUTs 122-126. Continuing with this example, visibility tool(s) 118 may generate performance metrics or correlate telemetry information associated with SUTs 122-126 and may send the reports to test system 102 or entities therein for analysis or other purposes.

SUT connector 120 may be any suitable entity or entities (e.g., software executing on a processor, an ASIC, an FPGA, or a combination of software, an ASIC, or an FPGA) for connecting SUTs 122-126 and test system 102, e.g., via CTI 116. For example, SUT connector 120 may include a software programmable patch panel for connecting SUTs 122-126 to one or more CTIEs (e.g., programmable devices) in a variety of configurations. In another example, SUT connector 120 may include an L1 switch or another switch for connecting SUTs 122-126 and one or more CTIEs. In some embodiments, TIO 106 may send configuration information and/or related information (e.g., VLAN switching data) for configuring SUT connector 120 for a particular test session.

Each of SUTs 122-126 may be any suitable entity or entities (e.g., devices, systems, or platforms) for receiving, processing, forwarding, and/or sending one or more messages (e.g., packets). For example, each of SUTs 122-126 may include a network node, a network switch, a network router, a network interface card, a packet forwarding device, or one or more virtual network functions (VNF). In some embodiments, SUTs 122-126 may be part of a same network, a same data center, or a same switching fabric. In some embodiments, SUT 122 may include processing logic (e.g., rules associated with packet forwarding/processing) that is independent or separate from SUTs 124 and 126.

It will be appreciated that FIG. 1 is for illustrative purposes and that various depicted entities, their locations, and/or their functions described above in relation to FIG. 1 may be changed, altered, added, or removed.

Figure 2:
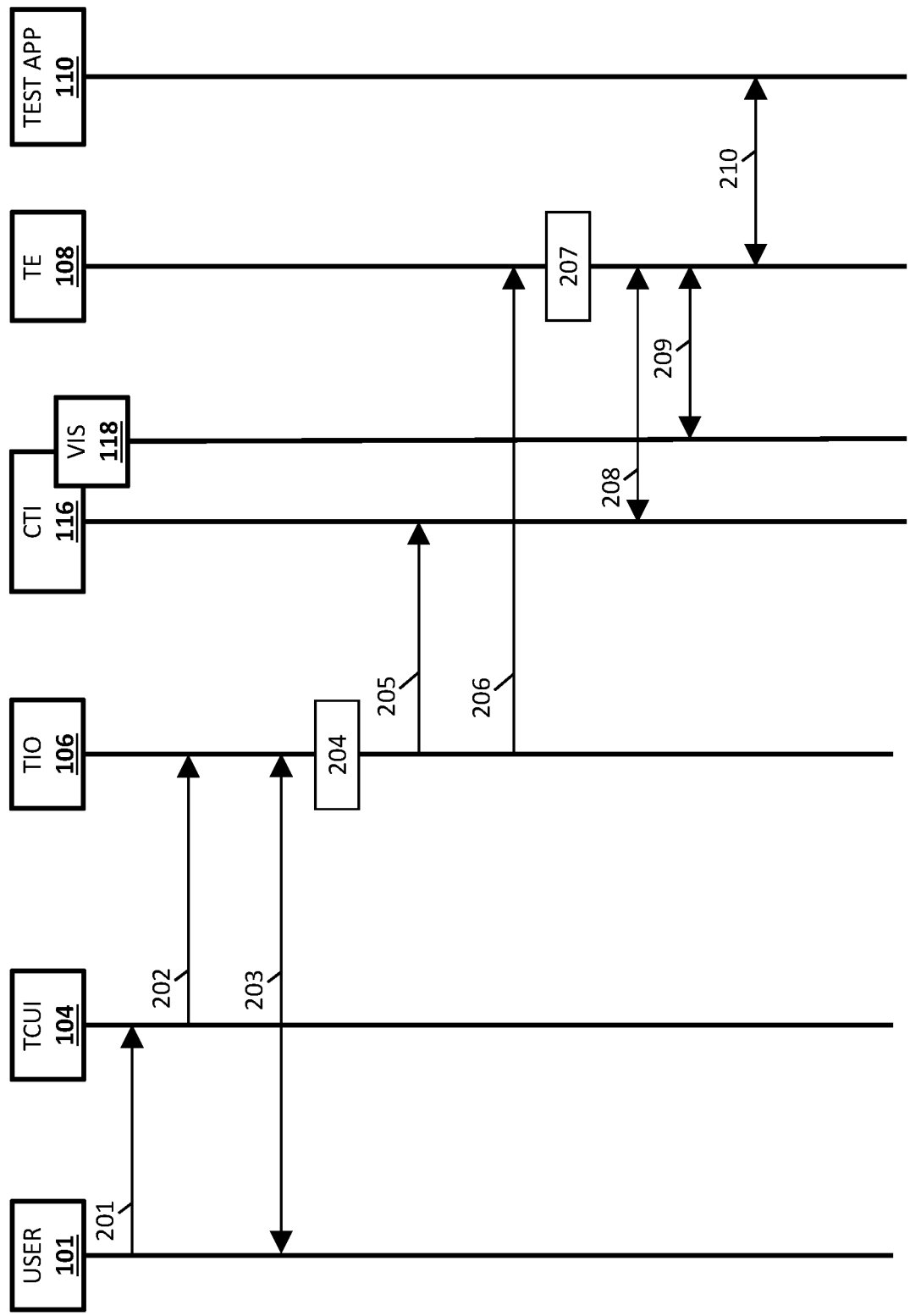
FIG. 2 is a diagram illustrating example interactions involving a test environment comprising a CTI.

FIG. 2 is a diagram illustrating example interactions involving test environment 100 comprising CTI 116. In some embodiments, various test system related entities (e.g., TCUI 104, TIO 106, TE 108, and test app(s) 110) may be located and/or executed using compute resources (e.g., physical or virtual processors or servers) in compute resource pool 103 of test system 102. In such embodiments, compute resource pool 103, CTI 116, or related CTIEs may be located in a distributed computing environment or a cloud computing platform (e.g., AWS platform, Azure platform, an edge cloud platform, a private cloud platform, etc.).

Referring to FIG. 2, in step 201, user 101 may select test content (e.g., one or more test session templates, definitions, or related data) via TCUI 104, where the selected test content may be usable for configuring a CTI for one or more purposes and for executing related testing using the CTI. In some embodiments, user browsing and selection of test content may be facilitated or performed via an exposed API that is accessible to user 101.

In step 202, TCUI 104 may send selected test content or other information to TIO 106 for orchestrating a selected test session, e.g., setting up CTI 116 or other test related entities. For example, TCUI 104 may send a test session definition associated with selected test content. In this example, the test session definition may be received and analyzed by TIO 106 to determine appropriate actions for setting up the test session.

In step 203, after test content is selected via TCUI 104, user 101 may be prompted by TCUI 104 or TIO 106 to input additional configuration settings and parameter values. For example, selection of a test session may imply a particular CTI topology, which may need additional configuration information from user 101. Additional configuration settings & parameters may include, for example, settings related to SUTs 122-126, settings related to an emulated device, switching fabric element, or link, settings related to traffic generation engines or traffic flows.

In step 204, TIO 106 may be configured to receive and/or generate configuration instructions for configuring or setting up CTI 116 or other test related entities based at least in part on a selected test session for execution. For example, TIO 106 may generate commands or instructions responsible for configuring or standing up CTIEs needed for a particular test session. In another example, TIO 106 may generate commands or instructions responsible for configuring SUT connector 120 and/or one or more SUTs 122-126 or elements therein.

In step 205, TIO 106 may be configured to send configuration instructions via management network 114 to CTIEs of CTI 116 or other test related entities based at least in part on a selected test session for execution. For example, TIO 106 may send commands or instructions responsible for configuring or standing up CTIEs needed for a particular test session. In another example, TIO 106 may send commands or instructions responsible for configuring SUT connector 120 and/or one or more SUTs 122-126 or elements therein.

In step 206, after CTI 116 has been configured for a test session, TIO 106 may signal or otherwise indicate to TE 108 that setup is complete and that testing may be executed.

In step 207, TE 108 may be configured to initiate and manage execution of a test involving CTI 116. For example, TE 108 may communicate with and control CTIEs of CTI 116 (e.g., emulated switching fabric, visibility components, third party apps, etc.) during a test session and may use these CTIEs to gather telemetry or performance results. In another example, TE 108 may communicate with one or more visibility tool(s) 118 located in or separate from CTI 116.

In step 208, telemetry and/or test related information (e.g., performance metrics) may be obtained from CTI 116 from CTIEs therein, e.g., during or after a test session.

In step 209, telemetry and/or test related information (e.g., performance metrics) may be obtained from visibility tool(s) 118, e.g., during or after a test session.

In step 210, test app(s) 110 (e.g., native and/or third party applications) may request test related information (e.g., a performance report or other test analysis data) from TE 108 or another entity.

It will be appreciated that a same test session executed against two different SUTs may result in the use of two different CTI configurations, e.g., depending upon the performance capabilities of the two different SUTs. Similarly, it will be appreciated that two different test sessions involving the same SUT may result in the use of two different CTI configurations, e.g., depending upon the requirements of the two different test sessions.

It will also be appreciated that FIG. 2 is for illustrative purposes and that different and/or additional actions or interactions may occur. It will also be appreciated that various actions described herein may occur in a different order or sequence.

Figure 3:
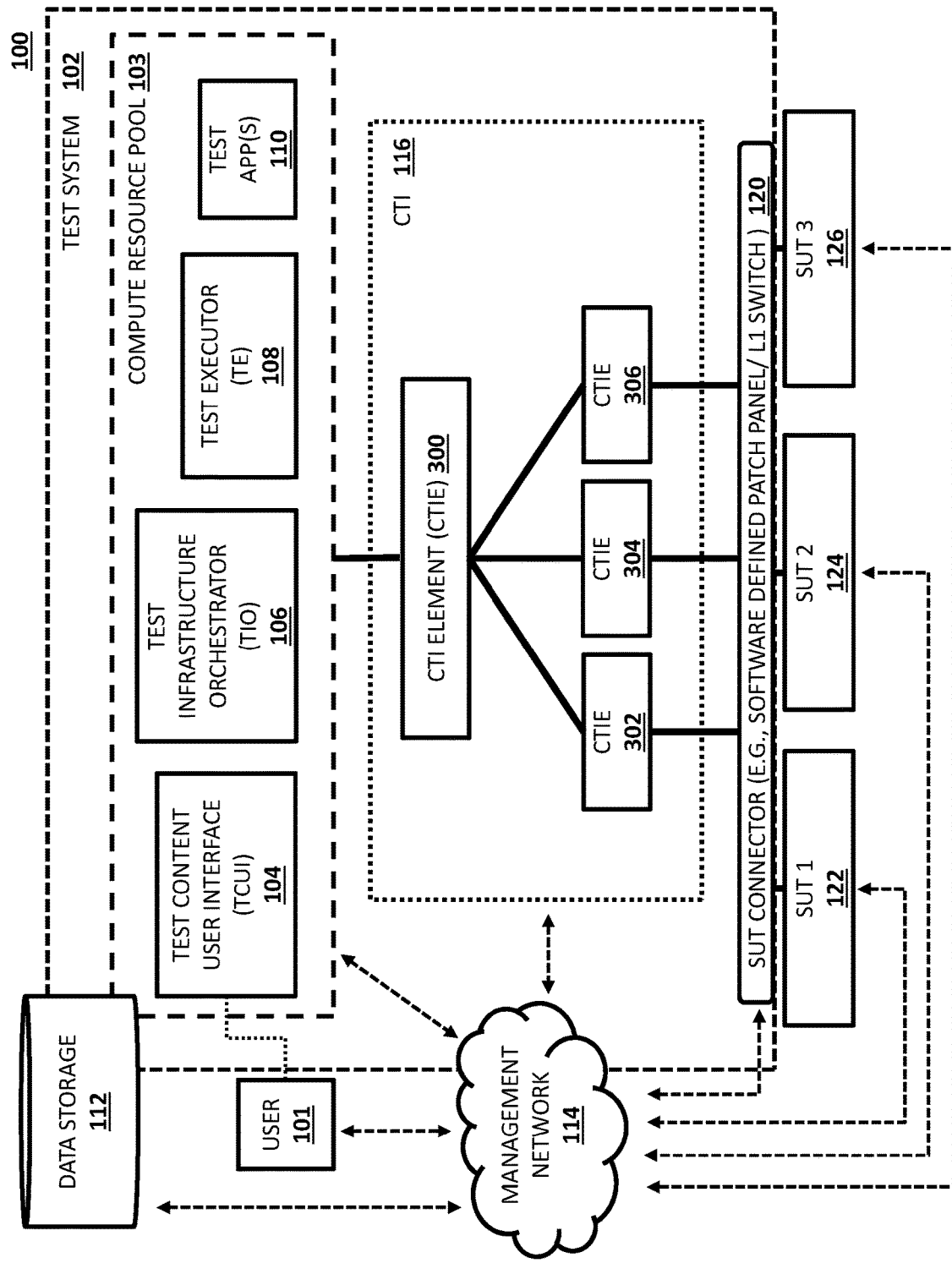
FIG. 3 is a diagram illustrating an example test infrastructure configuration.

FIG. 3 is a diagram illustrating an example test infrastructure configuration. In some embodiments, test system 102 may configure CTI 116 by sending commands and/or configuration instructions to CTIEs 300-306 in CTI 116 via management network 114. For example, prior to TE 108 initiating a test session, TIO 106 may set up or configure CTI 116 for the test session. In this example, TIO 106 may send particular configuration instructions to each of CTIEs 300-306.

Each of CTIEs 300-306 may represent any suitable entity (e.g., programmable device or platform) capable of performing one or more test related functions. For example, each of CTIEs 300-306 may be a software configurable white box switch or a network appliance. In this example, each of CTIEs 300-306 may be capable of being configured to act as a packet switch (e.g., leaf fanout switch or a spine or root fanout switch), a test packet generator, a telemetry processor, a traffic visibility element, or various combinations thereof.

In some embodiments, CTIEs 300-306 may include ASICs, processors, or other hardware and/or software that are dynamically configurable. For example, each of CTIEs 300-306 may include predefined operating systems (OS) that can be changed (e.g., with or without rebooting) to allow a CTIE to perform different test related functions. In another example, CTIEs 300-306 may be (re-)programmed to perform one or more test related functions via a configuration file, a REST API, remote commands or instructions, etc.

Referring to FIG. 3, the depicted test infrastructure configuration may include CTIE 300 being configured to act as a root fanout switch for forwarding test traffic to CTIEs 302-306 and each of CTIEs 302-306 being configured to act as a leaf fanout switch for forwarding test traffic to SUTs 122-126. CTIEs 302-306 may also receive and forward response traffic from respective SUTs 122-126 to CTIE 300 and CTIE 300 may forward the response traffic to TE 108 and/or another test related entity.

It will be appreciated that FIG. 3 is for illustrative purposes and that various depicted entities, their locations, and/or their functions described above in relation to FIG. 3 may be changed, altered, added, or removed.

Figure 4:
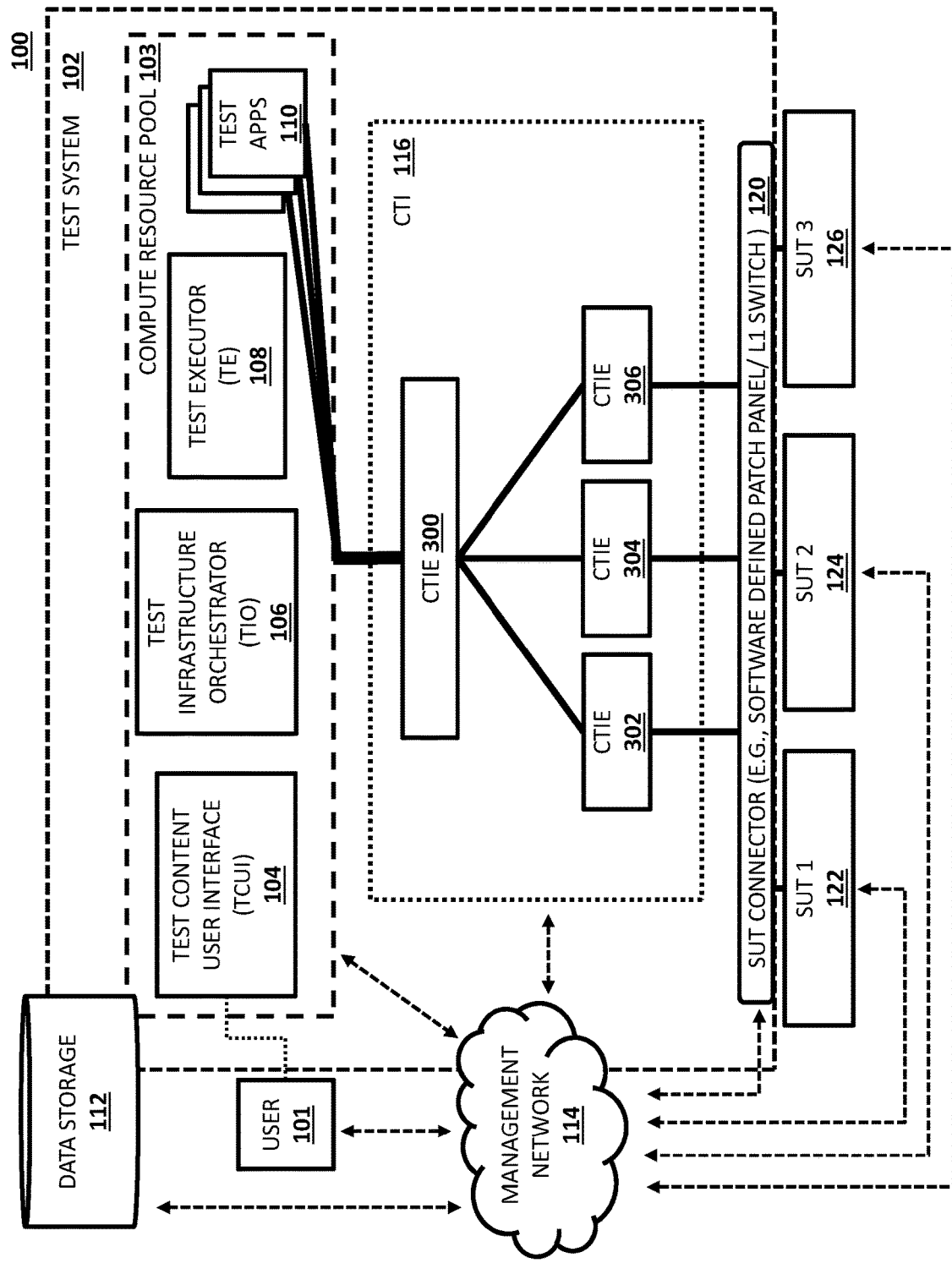
FIG. 4 is a diagram illustrating an example test infrastructure configuration involving test traffic forwarded via CTIEs.

FIG. 4 is a diagram illustrating an example test infrastructure configuration involving test traffic forwarded via CTI elements. In some embodiments, test system 102 may configure CTI 116 such that test traffic from sources outside of CTI 116 (e.g., test app(s) 110) can be received by SUTs 122-126. For example, test app(s) 110 may include third party test apps and native test apps implemented using compute resources from compute resource pool 103 and each may be configured to generate different types of test traffic (or different traffic flows) for transmission to SUTs 122-126 via CTI 116. In this example, CTIEs 300-306 may be configured to forward the test traffic to SUTs 122-126.

Referring to FIG. 4, the depicted test infrastructure configuration may include each of CTIEs 302-306 being configured to act as a leaf fanout switch for forwarding test traffic and CTIE 300 being configured to act as a root fanout switch for forwarding test traffic. As such, the depicted test infrastructure configuration allows test traffic to traverse CTIE 300 and one or more of CTIEs 302-306) before reaching SUTs 122-126.

In some embodiments, an example use case for the depicted test infrastructure configuration involves testing SUTs 122-126 using test traffic generated by multiple test apps 110 and transmitted to SUTs 122-126 via CTI 116. In this use case, none of CTIEs 300-306 may be configured to generate test traffic and, instead, all test traffic may be generated within compute resource pool 103 and subsequently transmitted to SUTs 122-126 via CTI 116 (e.g., CTIEs 300-306).

It will be appreciated that FIG. 4 is for illustrative purposes and that various depicted entities, their locations, and/or their functions described above in relation to FIG. 4 may be changed, altered, added, or removed.

Figure 5:
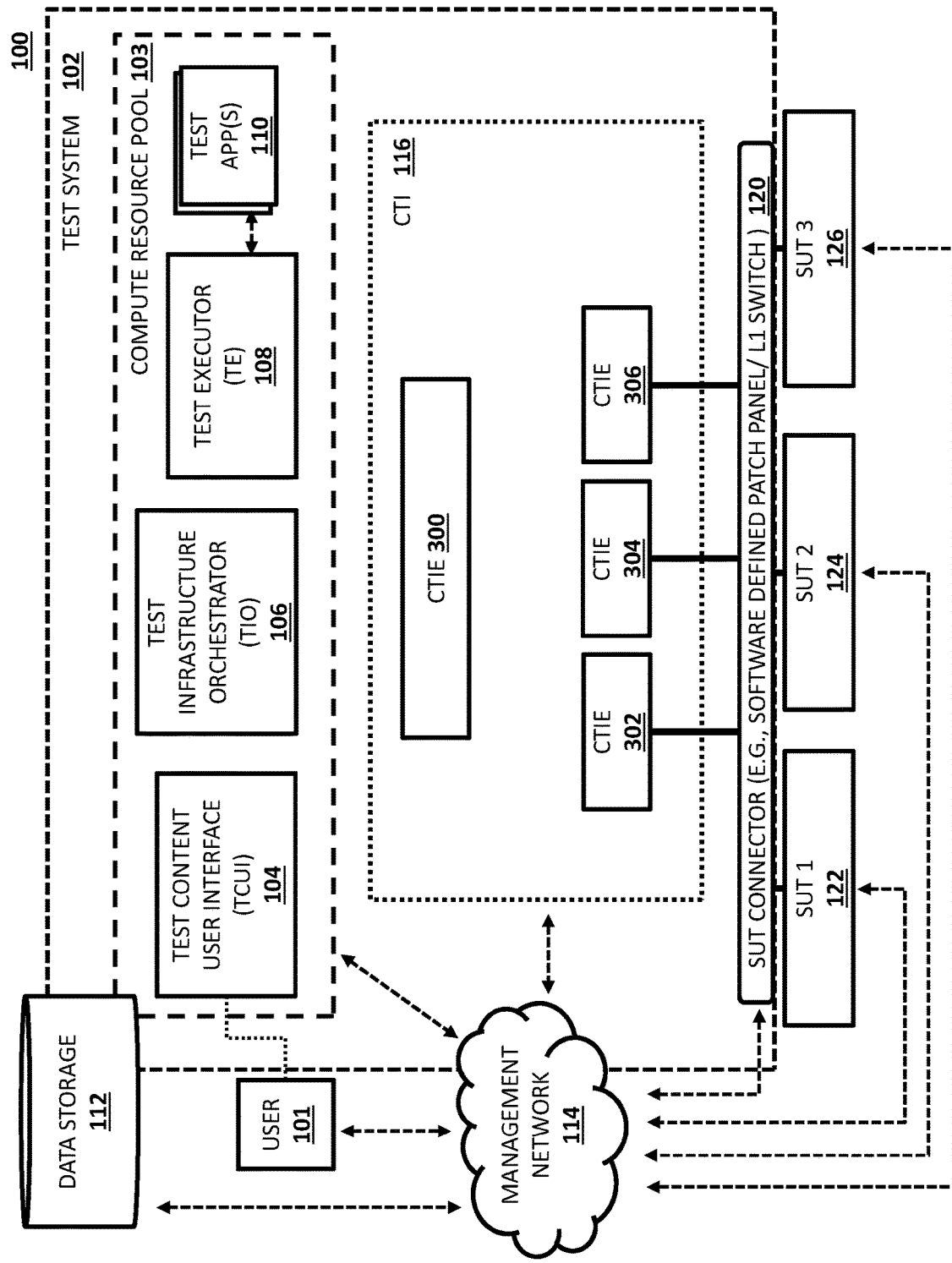
FIG. 5 is a diagram illustrating an example test infrastructure configuration involving test traffic generated by CTIEs.

FIG. 5 is a diagram illustrating an example test infrastructure configuration involving test traffic generated by CTI elements. In some embodiments, test system 102 may configure CTI 116 such that test traffic is generated by CTIEs 302-306 and received by SUTs 122-126, respectively. For example, test app(s) 110 may be implemented using compute resources from compute resource pool 103 and may trigger CTIEs 302-306 to generate test traffic for SUTs 122-126 during a test session. In this example, CTIEs 302-306 may be configured to generate test traffic via management network 114 by TIO 106 or another test related entity, e.g., prior to the test session being executed.

Referring to FIG. 5, the depicted test infrastructure configuration may include CTIEs 302-306, where each of CTIE may be configured to act as a test packet generator for generating and sending test traffic to a respective SUT. As shown in FIG. 5, CTIE 300 may not be needed or used in this configuration and therefore may not be (re-)configured for performing a test related function.

In some embodiments, an example use case for the depicted test infrastructure configuration involves testing SUTs 122-126 with only test traffic being generated by CTIEs 302-306, e.g., along the edge of CTI 116. In this use case, test traffic may not traverse CTIE 300 since there is no test traffic being generated by entities implemented using compute resource pool 103.

It will be appreciated that FIG. 5 is for illustrative purposes and that various depicted entities, their locations, and/or their functions described above in relation to FIG. 5 may be changed, altered, added, or removed.

Figure 6:
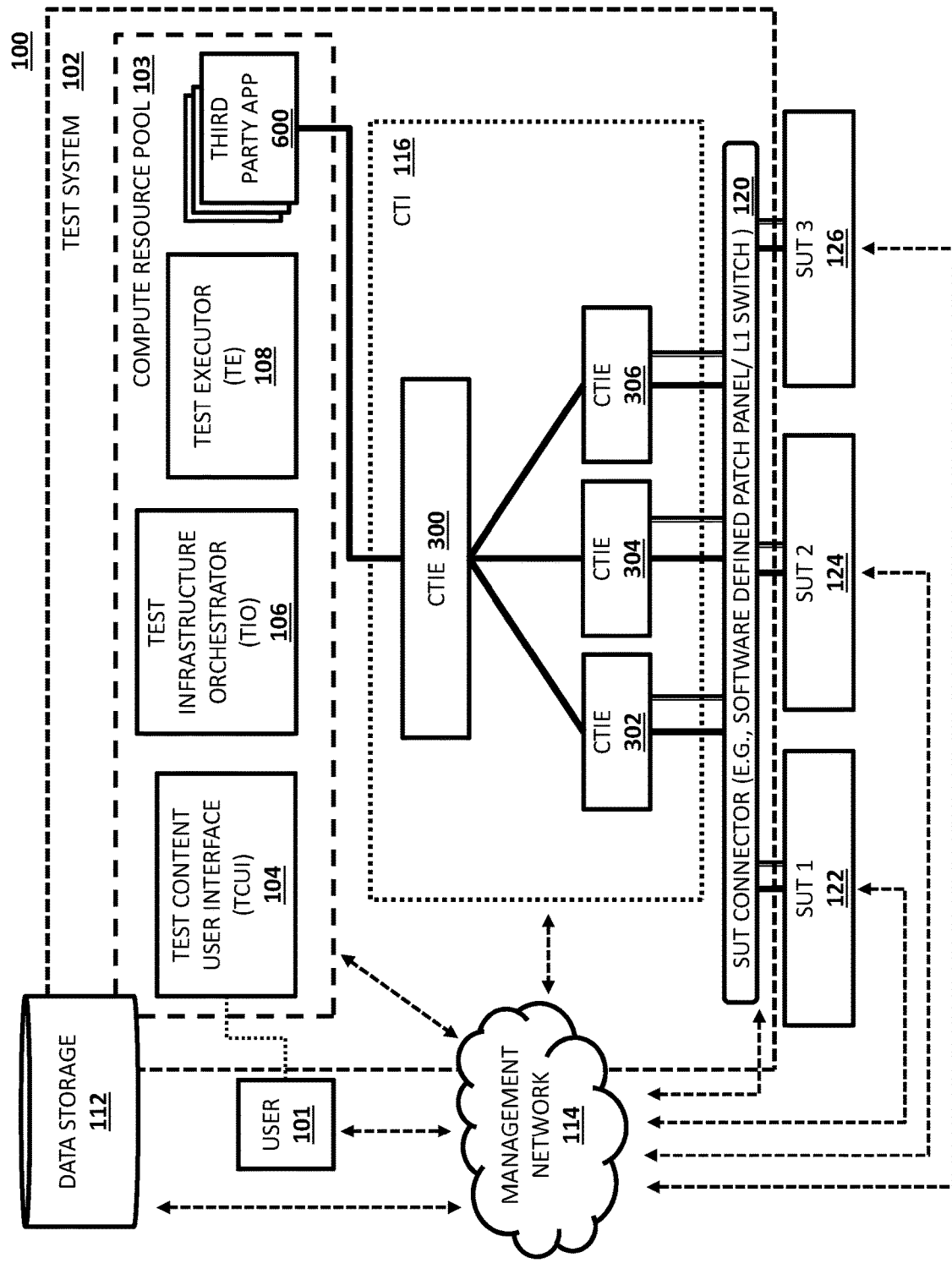
FIG. 6 is a diagram illustrating an example test infrastructure configuration involving mixed traffic.

FIG. 6 is a diagram illustrating an example test infrastructure configuration involving mixed traffic. In some embodiments, test system 102 may configure CTI 116 such that test traffic from multiple sources (e.g., CTIEs 302-306 and third party app 600) can be received by SUTs 122-126. For example, third party app 600 may be implemented using compute resources from compute resource pool 103 and may be configured to generate test traffic that is transmitted to SUTs 122-126 via CTI 116. In this example, CTIEs 302-306 may be configured to generate additional test traffic and may be configured to forwarding self-generated test traffic and third party generated test traffic to SUTs 122-126.

Referring to FIG. 6, the depicted test infrastructure configuration may include CTIEs 302-306, where each of CTIE may be configured to act as a test packet generator for generating and sending test traffic to a respective SUT and to act as a leaf fanout switch for forwarding various types of traffic. As shown in FIG. 6, CTIE 300 may be configured to act as a root fanout switch for forwarding test traffic. As such, the depicted test infrastructure configuration allows some test traffic (e.g., third party app generated test traffic) to traverse CTIE 300 (and one or more of CTIEs 302-306) before reaching SUTs 122-126, while other test traffic (e.g., CTIE generated test traffic) may traverse a respective leaf node switch (e.g., one of CTIEs 302-306 but not CTIE 300) before reaching one of SUTs 122-126.

In some embodiments, an example use case for the depicted test infrastructure configuration involves testing SUTs 122-126 using precision timed test traffic generated in CTI 116 and test traffic generated in third party app 600 (e.g., in compute resource pool 103). In such embodiments, test traffic generated by each of CTIEs 302-306 may be controlled or managed by TE 108 or test app(s) 110.

Referring again to FIG. 6, in some embodiments, a test case executed by the test system includes control plane test traffic that is generated by app 600 (e.g., in compute resource pool 103), which is directed to SUTs 122-126 via switching functionality configured in CTIEs 300-306. In such embodiments, CTIEs 302-306 may also be configured with packet generation functionality, which enables them to generate associated user plane test traffic that is directed to SUTs 122-126. With this type of test system configuration, highbandwidth user plane packet traffic can be generated in a distributed manner at the edge of the test system's internal network, while lower-bandwidth control plane traffic is generated in the core of the test system's internal network.

It will be appreciated that FIG. 6 is for illustrative purposes and that various depicted entities, their locations, and/or their functions described above in relation to FIG. 6 may be changed, altered, added, or removed.

Figure 7:
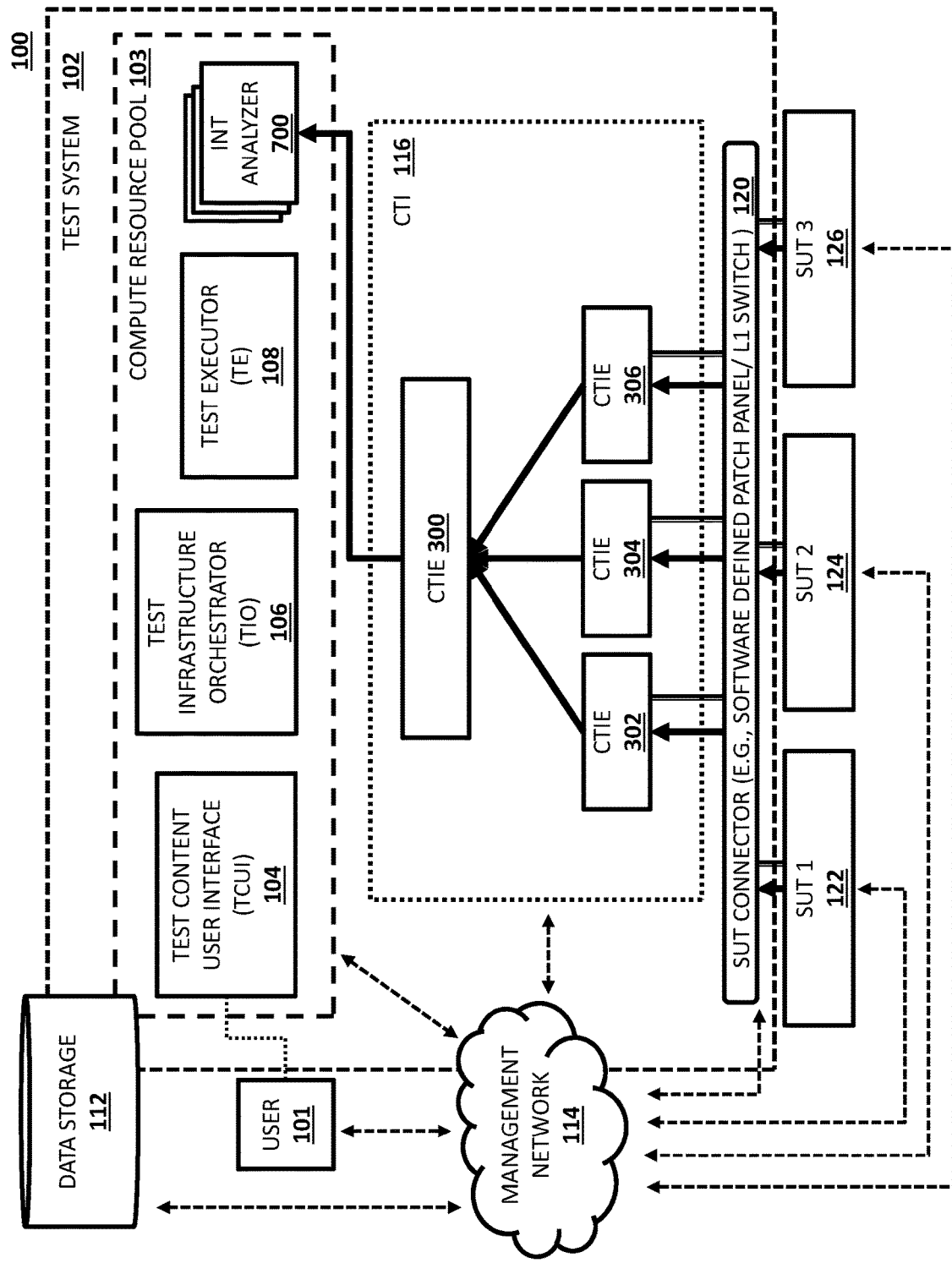
FIG. 7 is a diagram illustrating an example test infrastructure configuration involving obtaining telemetry information via CTIEs.

FIG. 7 is a diagram illustrating an example test infrastructure configuration involving obtaining telemetry information via CTI elements. In some embodiments, test system 102 may configure CTI 116 such that telemetry (e.g., INT information) from SUTs 122-126 can be received and analyzed, e.g., by INT analyzer 700, during testing. For example, INT analyzer 700 may represent a module implemented using compute resources from compute resource pool 103 and may be configured to receive and analyze telemetry information from various sources, e.g., SUTs 122-126, CTIEs 300-306, and/or management network 114.

Referring to FIG. 7, the depicted test infrastructure configuration may include CTIEs 302-306, where each of CTIE may be configured to act as a test packet generator for generating and sending test traffic to a respective SUT and to act as a leaf fanout switch for forwarding various types of traffic. As shown in FIG. 7, CTIE 300 may be configured to act as a root fanout switch for forwarding various types of traffic (including forwarding telemetry information) to INT analyzer 700.

In some embodiments, an example use case for the depicted test infrastructure configuration involves testing SUTs 122-126 using precision timed test traffic generated in CTI 116 while receiving and analyzing telemetry. In such embodiments, test traffic generated by each of CTIEs 302-306 may be controlled or managed by TE 108 or test app(s) 110.

It will be appreciated that FIG. 7 is for illustrative purposes and that various depicted entities, their locations, and/or their functions described above in relation to FIG. 7 may be changed, altered, added, or removed.

Figure 8:
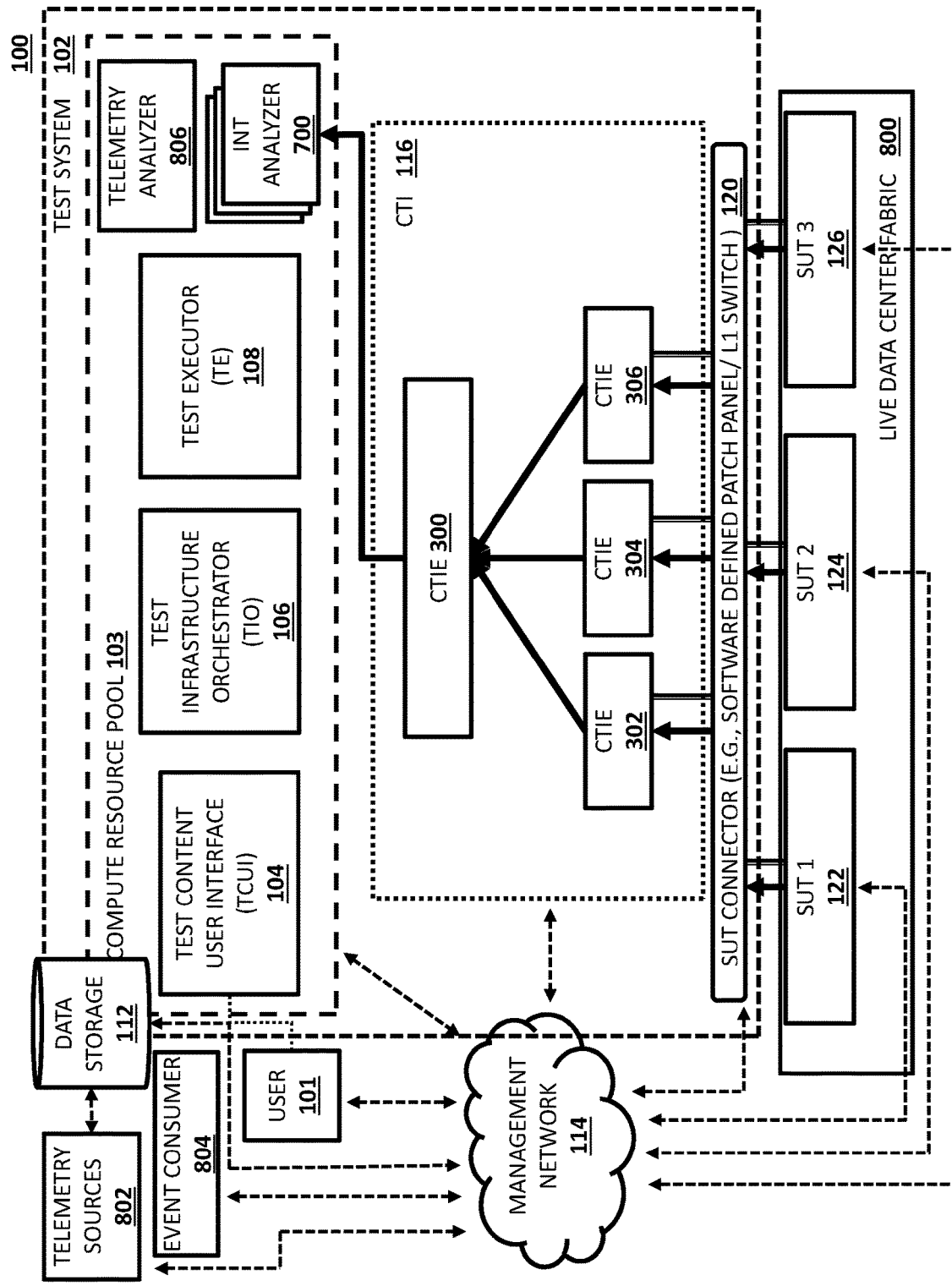
FIG. 8 is a diagram illustrating another example test infrastructure configuration involving obtaining telemetry information via CTIEs.

FIG. 8 is a diagram illustrating another example test infrastructure configuration involving obtaining telemetry information via CTI elements. In some embodiments, test system 102 may configure CTI 116 for testing a live or production data center fabric 800. In such embodiments, external events and other external telemetry information may be received by test system 102 (e.g., by TE 108) and may be used, for example, to dynamically re-configure one or more CTIEs (e.g., CTIEs 300-306) associated with a given test session in response to various observed external events or telemetry (e.g., INT) information. For example, prior to and/or during a test session, telemetry sources 802 and external event consumer 804 may provide relevant information to test system 102 (e.g., via management network 114, a test system API, and/or data storage 112). In this example, prior to and/or during the test session, test system 102 or (a related entity) may use this telemetry and event information to generate and send updated configuration instructions for changing the test related functions of one or more of CTIEs 300-306.

Referring to FIG. 8, the depicted test infrastructure configuration may include CTIEs 302-306, where each of CTIE may be configured to act as a test packet generator for generating and sending test traffic to a respective SUT, to insert or forward telemetry information for collection by INT analyzer 700 or telemetry analyzer 806, and to act as a leaf fanout switch for forwarding various types of traffic. As shown in FIG. 8, CTIE 300 may be configured as a root fanout switch for forwarding various types of traffic (including forwarding telemetry information) to INT analyzer 700 or telemetry analyzer 806.

In some embodiments, an example use case for the depicted test infrastructure configuration involves performing "day 2" data center test and observation actions, e.g., configuration changes, upgrades, traffic drain, and/or active probes. In such embodiments, the depicted test infrastructure configuration may be utilized for observing and measuring actual traffic along with testing using traffic generation for timing precision.

It will be appreciated that FIG. 8 is for illustrative purposes and that various depicted entities, their locations, and/or their functions described above in relation to FIG. 8 may be changed, altered, added, or removed.

Figure 9:
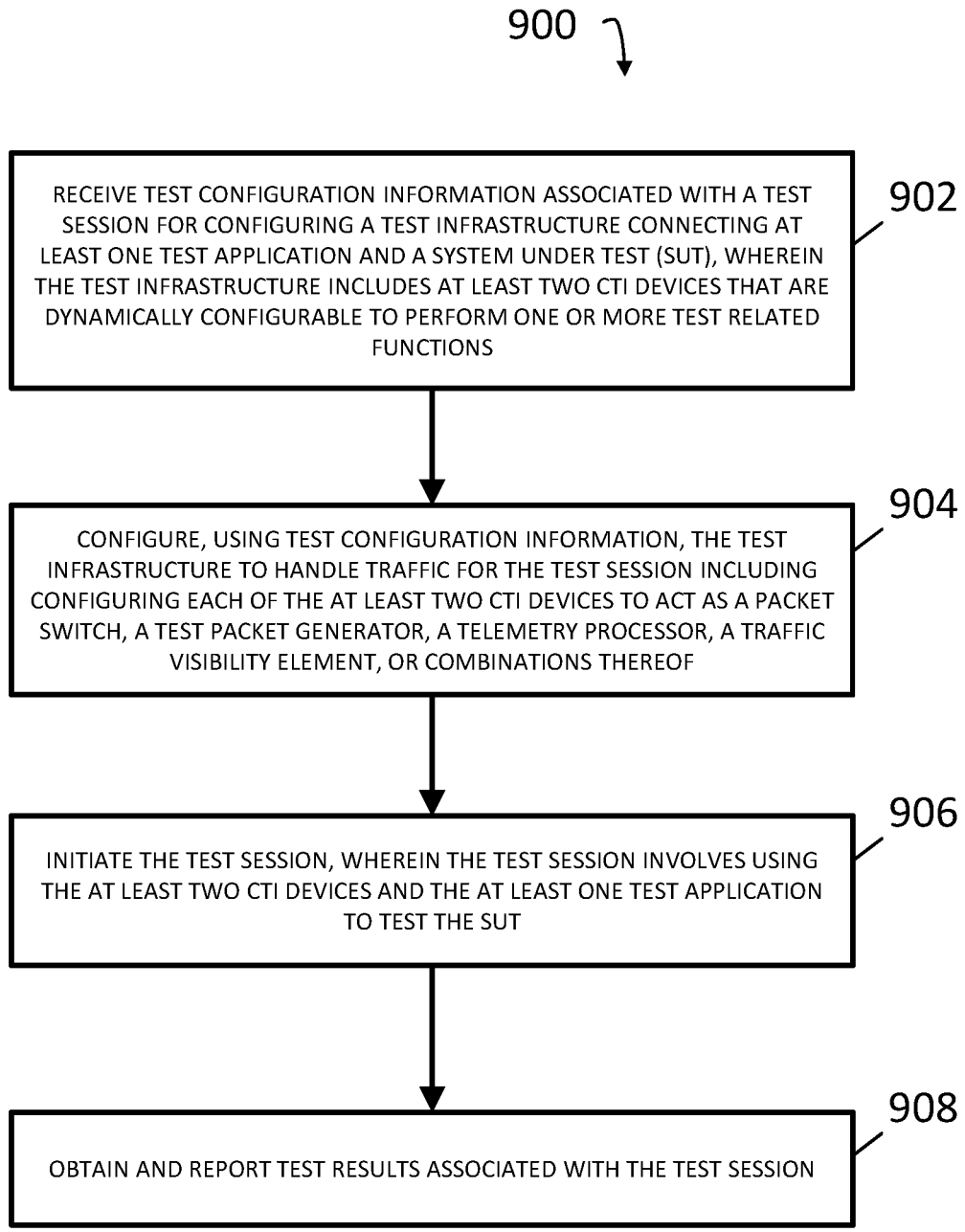
FIG. 9 is a diagram illustrating an example process for network testing using a CTI.

FIG. 9 is a diagram illustrating an example process 900 for network testing using CTI. In some embodiments, process 900, or portions thereof, may be performed by or at test system 102 and/or another node or module. In some embodiments, process 900 may include steps 902, 904, and/or 906.

Referring to process 900, in step 902, test configuration information associated with a test session for configuring a test infrastructure connecting at least one test application and a SUT may be received. In some embodiments, the test infrastructure may include at least two CTI devices. For example, user 101 may select test content or related information from data storage 112 via TCUI 104 and TIO 106 may use the information to send configuration instructions configure CTI 116 or related CTIEs 300-306 for testing SUTs 122-126.

In some embodiments, test configuration information may include configuration instructions for configuring one or more CTI devices (e.g., CTIEs 300-306) to act as a packet switch (e.g., a leaf fanout switch, a spine or root fanout switch, etc.), a test packet generator, a telemetry processor, a traffic visibility element, or combinations thereof.

In some embodiments, test configuration information associated with a test session may be obtained from a data store (e.g., data storage 112) containing test session definition information, wherein a test session definition information may include information for defining how the test session is to be executed and configuration instructions for configuring at least one CTI element for the test session.

In some embodiments, configuration instructions may include packet switching element configuration instruction information, traffic packet generation element configuration instruction information, traffic visibility element configuration instruction information, or telemetry processing element configuration instruction information.

In some embodiments, test configuration information may include test application configuration instructions for configuring a test packet generation application, a telemetry analysis application, a test performance analysis application, a test configuration application, a traffic visibility application, or a test reporting application.

In step 904, the test infrastructure may be configured, using the test configuration information, to handle traffic for the test session including configuring each of the at least two CTI devices to act as a packet switch, a test packet generator, a telemetry processor, a traffic visibility element, or combinations thereof.

In some embodiments, a CTI device (e.g., one of CTIEs 300-306) may be configured to generate, send, or process test packets, non-test packets, or a mixture of test packets and non-test packets.

In step 906, the test session may be initiated, wherein the test session involves using the at least two CTI devices and the at least one test application to test a SUT. For example, TE 108 may execute a test session using CTI 116 with one or more CTIEs. In this example, TE 108 may send start instructions to one or more traffic generators and/or test analyzers.

In step 908, performance results associated with the test session may be obtained and reported. For example, using telemetry information, performance metric or other information, TE 108 or a related entity (e.g., visibility tool(s) 118) may perform a performance analysis, generate a related performance report, and may provide the performance report to a user 101 (e.g., via TCUI 104) or to another requesting entity, e.g., a third party test tool or GUI.

In some embodiments, a test system (e.g., test system 102) may communicate configuration instructions to one or more CTI devices (e.g., CTIEs 300-306) via a separate management network (e.g., management network 114) or a test system API server.

In some embodiments, at least one test application (e.g., test app(s) 110) may be implemented using at least one compute resource from a compute resource pool (e.g., computer resource pool 103).

In some embodiments, a SUT (e.g., SUT 122) may include a network switch, a data center switching fabric, a network node, a server, a network interface card, an application server, or a group of servers.

It will be appreciated that process 900 is for illustrative purposes and that different and/or additional actions may be used. It will also be appreciated that various actions described herein may occur in a different order or sequence.

It should be noted that test system 102 and/or functionality described herein may constitute a special purpose computing device. Further, test system 102 and/or functionality described herein can improve the technological field of testing networks or other equipment. For example, by using CTI 116 or CTIEs, an example test system can perform network testing that may not have been possible using previous test systems or that may have been very time consuming, expensive, and potentially prone to human-error (e.g., because of manual (re-)cabling or required for different test sessions).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network testing using a configurable test infrastructure (CTI), the method comprising:
    at a test system implemented using at least one processor:
        receiving test configuration information associated with a test session for configuring a test infrastructure connecting at least one test application and a system under test (SUT), wherein the test infrastructure includes at least two CTI devices that are dynamically configurable to perform one or more test related functions, wherein the SUT includes a SUT device separate from the test infrastructure, wherein the SUT device is connected to the CTI devices via a software defined patch panel or a layer 1 switch;
        configuring, using the test configuration information, the test infrastructure to handle traffic for the test session including configuring each of the at least two CTI devices to act as a packet switch, a test packet generator, a telemetry processor, a traffic visibility element, or combinations thereof, wherein configuring the test infrastructure include configuring the software defined patch panel or the layer 1 switch for routing test traffic to or from particular links associated with the SUT device;
        initiating the test session, wherein the test session involves using the at least two CTI devices and the at least one test application to test the SUT; and
        obtaining and reporting test results associated with the test session.

2. The method of claim 1 wherein the test configuration information includes configuration instructions for configuring one of the at least two CTI devices to act as a packet switch, a test packet generator, a telemetry processor, a traffic visibility element, or combinations thereof.

3. The method of claim 1 wherein the test configuration information is obtained from a data store containing test session definition information, wherein the test session definition information includes information for defining how the test session is to be executed and configuration instructions for configuring the at least two CTI devices for the test session.

4. The method of claim 1 wherein the test configuration information includes packet switching element configuration instruction information, traffic packet generation element configuration instruction information, traffic visibility element configuration instruction information, or telemetry processing element configuration instruction information.

5. The method of claim 1 wherein the test configuration information includes test application configuration instructions for configuring a test packet generation application, a telemetry analysis application, a test performance analysis application, a test configuration application, a traffic visibility application, or a test reporting application.

6. The method of claim 1 wherein one of the at least two CTI devices is configured to generate, send, or process test packets, non-test packets, or a mixture of test packets and non-test packets.

7. The method of claim 1 wherein the test system communicates configuration instructions to each of the at least two CTI devices via a separate management network or a test system application programming interface (API) server.

8. The method of claim 1 wherein the at least one test application is implemented using at least one compute resource from a compute resource pool.

9. The method of claim 1 wherein the SUT includes a network switch, a data center switching fabric, a network node, a server, a network interface card, an application server, or a group of servers.

10. A system for network testing using a configurable test infrastructure (CTI), the system comprising:
    at least one processor;
    a test system implemented using the at least one processor, wherein the test system is configured for:
        receiving test configuration information associated with a test session for configuring a test infrastructure connecting at least one test application and a system under test (SUT), wherein the test infrastructure includes at least two CTI devices that are dynamically configurable to perform one or more test related functions, wherein the SUT includes a SUT device separate from the test infrastructure, wherein the SUT device is connected to the CTI devices via a software defined patch panel or a layer 1 switch;

configuring, using the test configuration information, the test infrastructure to handle traffic for the test session including configuring each of the at least two CTI devices to act as a packet switch, a test packet generator, a telemetry processor, a traffic visibility element, or combinations thereof, wherein configuring the test infrastructure include configuring the software defined patch panel or the layer 1 switch for routing test traffic to or from particular links associated with the SUT device;

initiating the test session, wherein the test session involves using the at least two CTI devices and the at least one test application to test the SUT; and obtaining and reporting test results associated with the test session.

11. The system of claim 10 wherein the test configuration information includes configuration instructions for configuring one of the at least two CTI devices to act as a packet switch, a test packet generator, a telemetry processor, a traffic visibility element, or combinations thereof.

12. The system of claim 10 wherein the test configuration information is obtained from a data store containing test session definition information, wherein the test session definition information includes information for defining how the test session is to be executed and configuration instructions for configuring the at least two CTI devices for the test session.

13. The system of claim 10 wherein the test configuration information includes packet switching element configuration instruction information, traffic packet generation element configuration instruction information, traffic visibility element configuration instruction information, or telemetry processing element configuration instruction information.

14. The system of claim 10 wherein the test configuration information includes test application configuration instructions for configuring a test packet generation application, a telemetry analysis application, a test performance analysis application, a test configuration application, a traffic visibility application, or a test reporting application.

15. The system of claim 10 wherein one of the at least two CTI devices is configured to generate, send, or process test packets, non-test packets, or a mixture of test packets and non-test packets.

16. The system of claim 10 wherein the test system communicates configuration instructions to each of the at least two CTI devices via a separate management network or a test system application programming interface (API) server.

17. The system of claim 10 wherein the at least one test application is implemented using at least one compute resource from a compute resource pool.

18. The system of claim 10 wherein the SUT includes a network switch, a data center switching fabric, a network node, a server, a network interface card, an application server, or a group of servers.

19. A non-transitory computer readable medium having stored thereon executable instructions embodied in the non-transitory computer readable medium that when executed by at least one processor of an test system cause the test system to perform steps comprising:

receiving test configuration information associated with a test session for configuring a test infrastructure connecting at least one test application and a system under test (SUT) comprising at least two configurable test infrastructure (CTI) devices, wherein the at least two CTI devices is dynamically configurable to perform one or more test related functions, wherein the SUT includes a SUT device separate from the test infrastructure, wherein the SUT device is connected to the CTI devices via a software defined patch panel or a layer 1 switch;

configuring, using the test configuration information, the test infrastructure to handle traffic for the test session including configuring each of the at least two CTI devices to act as a packet switch, a test packet generator, a telemetry processor, a traffic visibility element, or combinations thereof, wherein configuring the test infrastructure include configuring the software defined patch panel or the layer 1 switch for routing test traffic to or from particular links associated with the SUT device;

initiating the test session, wherein the test session involves using the at least two CTI devices and the at least one test application to test the SUT; and obtaining and reporting test results associated with the test session.

20. The non-transitory computer readable medium of claim 19 wherein the test configuration information includes configuration instructions for configuring one of the at least two CTI devices to act as a packet switch, a test packet generator, a telemetry processor, or combinations thereof.

* * * * *